United States Patent
Sundararaman et al.

(10) Patent No.: US 10,983,904 B1
(45) Date of Patent: Apr. 20, 2021

(54) TEST AUTOMATION FOR DATA PROCESSING

(71) Applicant: Accenture Global Solutions Limited, Dublin (IE)

(72) Inventors: Arun Sundararaman, Chennai (IN); Uday Kumar Ramamoorthy, Chenam (IN); Sureshkumar Pargunarajan, Chennai (IN); Haripriya Srinivasan, Thanjavur (IN); Tharani Dhanasekaran, Coimbatore (IN)

(73) Assignee: Accenture Global Solutions Limited, Dublin (IE)

( * ) Notice: Subject to any disclaimer, the term of this patent is extended or adjusted under 35 U.S.C. 154(b) by 19 days.

(21) Appl. No.: 16/675,739

(22) Filed: Nov. 6, 2019

(51) Int. Cl.
*G06F 11/36* (2006.01)

(52) U.S. Cl.
CPC ...... *G06F 11/3688* (2013.01); *G06F 11/3664* (2013.01); *G06F 11/3684* (2013.01)

(58) Field of Classification Search
None
See application file for complete search history.

(56) References Cited

U.S. PATENT DOCUMENTS

| | | | |
|---|---|---|---|
| 10,073,763 B1 * | 9/2018 | Raman | G06F 11/3664 |
| 2015/0100943 A1 * | 4/2015 | Gabel | G06F 8/30 717/106 |
| 2017/0099193 A1 * | 4/2017 | Mahajan | H04L 65/80 |
| 2017/0139956 A1 * | 5/2017 | Qiao | G06F 16/11 |
| 2018/0349256 A1 * | 12/2018 | Fong | G06F 40/35 |
| 2019/0213116 A1 * | 7/2019 | Kulkarni | G06F 11/3664 |
| 2020/0097388 A1 * | 3/2020 | Bhat | G06N 20/00 |

OTHER PUBLICATIONS

Gupta, "Big Data Testing", 2017, Published at http://guptayuvraj.github.io/post/Big-Data-Testing/ (Year: 2017).*

* cited by examiner

*Primary Examiner* — Hossain M Morshed
(74) *Attorney, Agent, or Firm* — Harrity & Harrity, LLP (57) ABSTRACT

A test automation platform may receive a test case for testing a data ingestion pipeline. The test automation platform may determine a test intent of the test case using a test intent identification model. The test automation platform may determine a type of entity associated with the data ingestion pipeline that the test case is to test using a test entity identification model. The test automation platform may generate a prediction of a data ingestion scenario for which the test case is to be applied based at least in part on the test intent of the test and the type of entity. The test automation platform may generate a mapping file representing the prediction of the data ingestion scenario. The test automation platform may execute, using test cases of the mapping file, a set of tests on a new data ingestion pipeline.

20 Claims, 7 Drawing Sheets

TEST AUTOMATION FOR DATA PROCESSING

BACKGROUND

In test automation, a test framework may be developed for testing functions of a software development project. For example, a set of test cases may be developed, incorporated into a test framework, and automatically executed on each build of the software development project. When each test case is successfully executed and passes on a build of the software development project, the build of the software development project may be deployed for utilization. Some test frameworks may be reconfigurable from a first software development project to a second software development project, thereby providing flexibility in test automation. However, reconfiguring a test framework may involve extensive re-writing of the test cases, recalibrating a success condition for a test case, and/or the like.

SUMMARY

According to some implementations, a method may include receiving, by a test automation platform, a test case for testing a data ingestion pipeline; determining, by the test automation platform, a test intent of the test case using a test intent identification model; determining a type of entity associated with the data ingestion pipeline that the test case is to test using a test entity identification model; generating, by the test automation platform, a prediction of a data ingestion scenario for which the test case is to be applied based at least in part on the test intent of the test and the type of entity; generating, by the test automation platform, a mapping file representing the prediction of the data ingestion scenario; identifying, by the test automation platform, a new data ingestion pipeline; selecting, by the test automation platform and using a testing model, the mapping file for testing the new data ingestion pipeline; executing, by the test automation platform and using test cases of the mapping file, a set of tests on the new data ingestion pipeline; and deploying, by the test automation platform, the new data ingestion pipeline for data acquisition based on executing the set of tests.

According to some implementations, a test automation platform may include one or more memories; and one or more processors, communicatively coupled to the one or more memories, configured to receive training data identifying a set of test cases for a set of data ingestion pipelines; process the training data to generate a test intent identification model associated with predicting a test intent for a test case; process the training data to generate a test entity identification model associated with predicting a type of test entity that the test case is to test; receive a new test case; analyze, using the test intent identification model and the test entity identification model, the new test case to determine the test intent and the type of test entity associated with the new test case; identify a new data ingestion pipeline; select the test case for testing the new data ingestion pipeline based on the test intent and the type of test entity; execute a test on the new data ingestion pipeline using the test case; and provide information identifying a result of the test.

According to some implementations, a non-transitory computer-readable medium may store one or more instructions. The one or more instructions, when executed by one or more processors of a test automation platform, may cause the one or more processors to receive a test case for testing a data ingestion pipeline; analyze the test case to determine a test intent of the test case using a test intent identification model and to determine a type of entity associated with the data ingestion pipeline that the test case is to test using a test entity identification model; generate a prediction of a data ingestion scenario for which the test case is to be applied based at least in part on the test intent of the test and the type of entity; generate a mapping file representing the prediction of the data ingestion scenario; and provide the mapping file for storage in a mapping file repository.

DETAILED DESCRIPTION

The following detailed description of example implementations refers to the accompanying drawings. The same reference numbers in different drawings may identify the same or similar elements.

As described above, a test framework may include a set of test cases that are executed on builds of a software development project to ensure an error-free deployment of the software development project. However, test automation may be poorly adapted to testing of data processing pipelines, such as for big data ingestion. For example, data ingestion pipelines may include large volumes of data, such as thousands, millions, or billions of data entries being ingested, different data source formats, integration of hybrid data sources, incremental loading, and integration with continuous integration and continuous delivery (CI/CD) pipelines.

As a result, development of a test framework for a data ingestion pipeline and/or adaptation of an existing test framework from a first data ingestion pipeline to a second data ingestion pipeline may be error-prone, time-consuming, and resource intensive. For example, static mapping between components of data ingestion pipelines may result in errors for environment testing, test phase configuration, test data management, and test case mapping to test scripts. Moreover, during CI/CD-based software development, interrupting operation of a program to perform testing may result in lost data, inefficient utilization of available computing resources, and/or the like.

Some aspects described herein provide artificial intelligence based test automation for data processing systems. For example, a test automation platform may use one or more machine learning models for analyzing a test case, classifying the test case and/or generating a mapping file including the test case, and predicting a set of test cases and/or an associated mapping file that is to apply to a new data ingestion pipeline. Based at least in part on predicting the set of test cases and/or the mapping file, the test automation platform may automatically execute one or more test scripts associated with one or more test cases (e.g., of the mapping file). In this example, based on a result of executing the one or more test scripts, the test automation platform may provide reporting functionalities, automatic deployment functionalities, and/or the like. In this way, the test automation platform reduces a likelihood of error in data ingestion pipeline deployment, thereby reducing errors associated with big data processing. Moreover, by using machine learning models and artificial intelligence to analyze test cases and data ingestion pipelines, the test automation platform enables successful deployment of customized test frameworks rather than inaccurate, statically mapped test frameworks. Furthermore, the test automation platform may integrate into a CI/CD environment, thereby enabling testing without interruption to data ingestion pipeline operation.

Figure 1A:
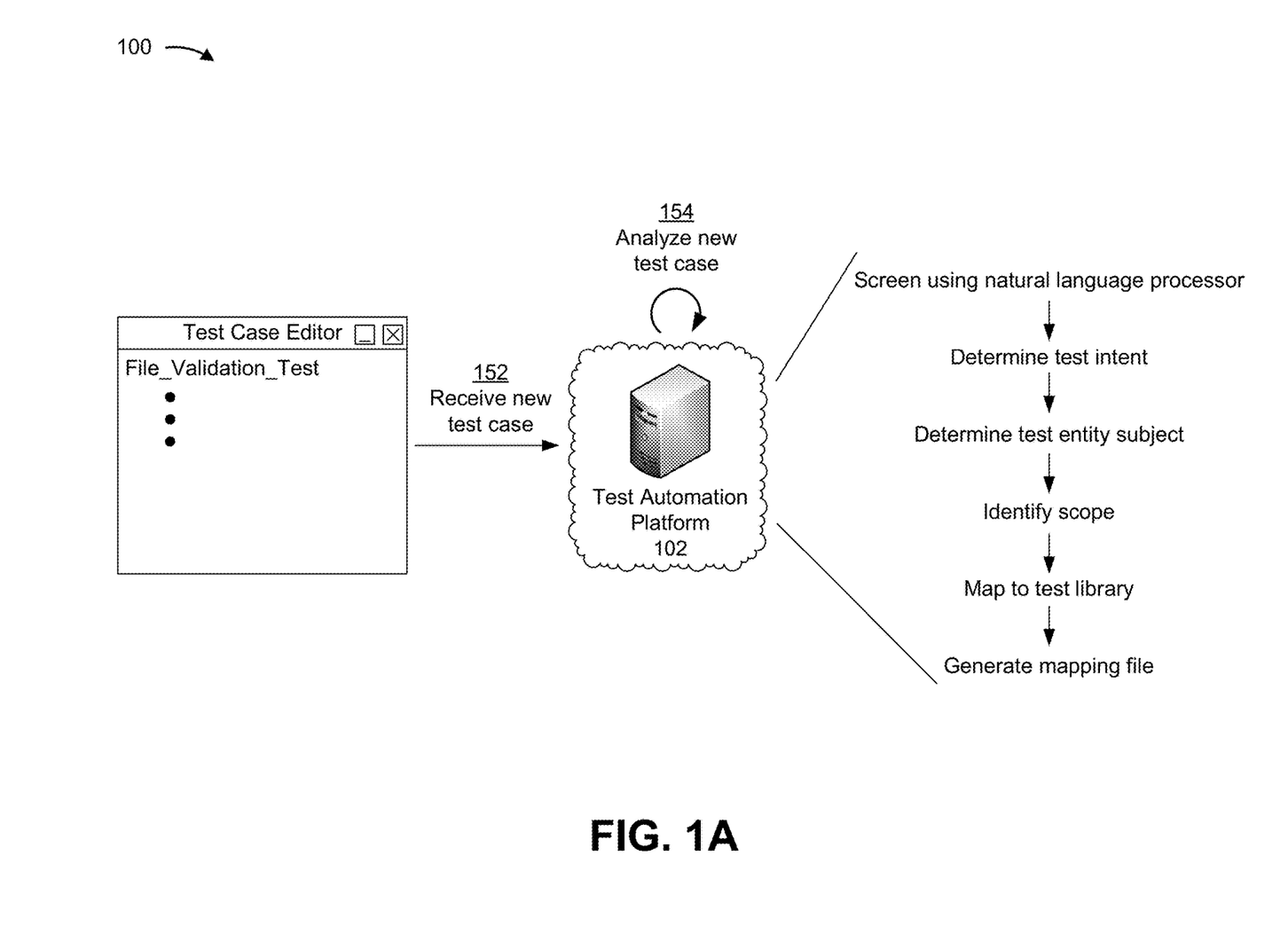
FIGS. 1A and 1B are diagrams of one or more example implementations described herein.
Figure 1B:
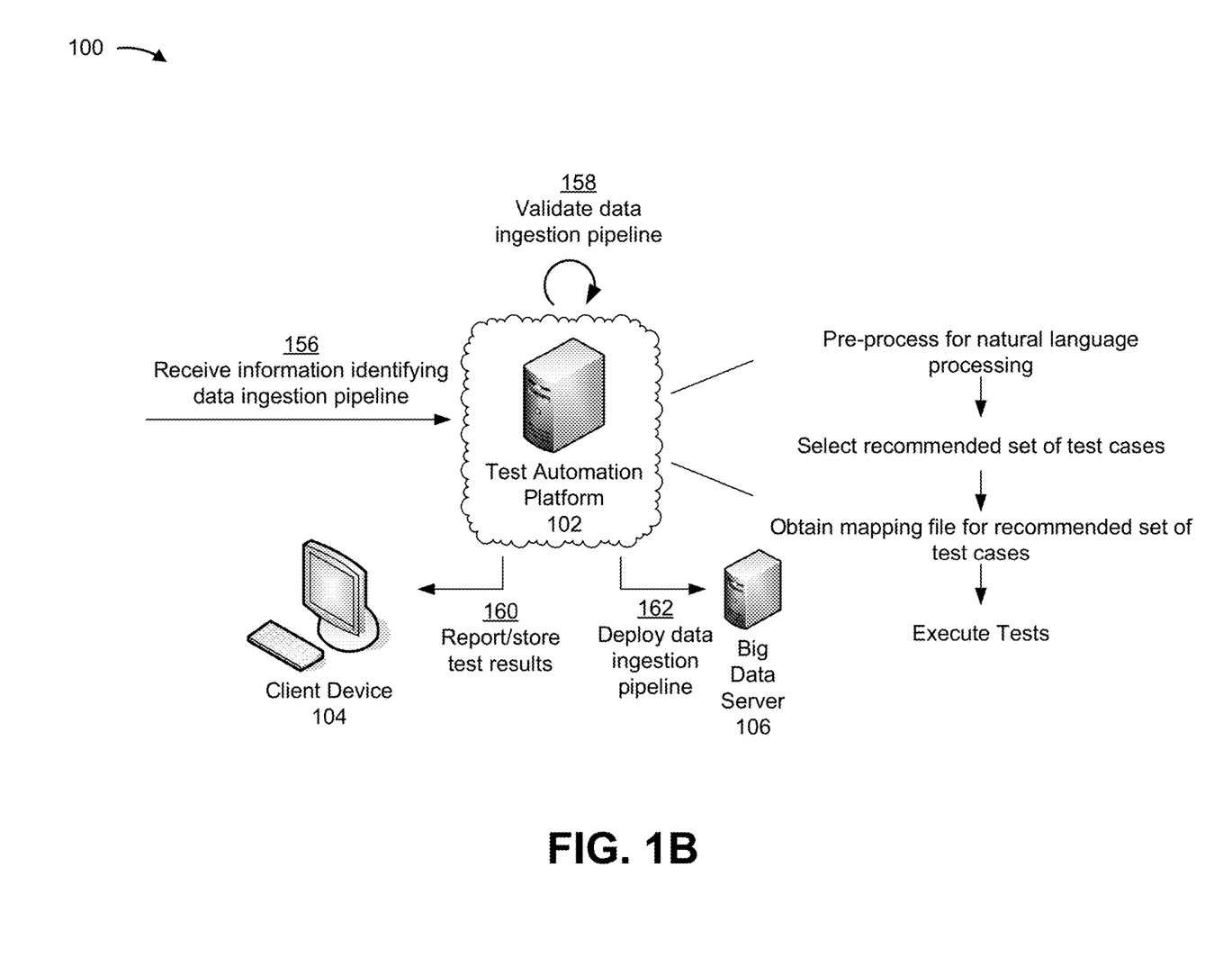

FIGS. 1A and 1B are diagrams of an example implementation 100 described herein. As shown in FIG. 1A, example implementation 100 includes a test automation platform 102.

As further shown in FIG. 1A, and by reference number 152, test automation platform 102 may receive information identifying a new test case. For example, test automation platform 102 may receive a description of a test case associated with one or more test scripts. In some implementations, test automation platform 102 may receive a natural language description of a test case. For example, test automation platform 102 may receive a description of a type of process, a source, a destination, a quantity of hops, an identity of the hops, a test phase, a type of load, a zone mapping, and/or the like. Additionally, or alternatively, test automation platform 102 may receive code for execution. For example, test automation platform 102 may receive a test script, a suite of test scripts, and/or the like. In some implementations, test automation platform 102 may provide a user interface for authoring a test case. For example, test automation platform 102 may provide a user interface to enable a user to provide a natural language description, program code, and/or the like for a test case. In this example, test automation platform 102 may monitor user entry into the user interface and may, periodically, provide code suggestions, natural language description suggestions, and/or the like based on stored test cases.

As further shown in FIG. 1A, and by reference number 154, test automation platform 102 may analyze the new test case. For example, test automation platform 102 may screen the new test case using a natural language processor. In this example, test automation platform 102 may apply a set of pre-processing procedures to prepare the new test case for natural language processing. For example, test automation platform 102 may apply a tokenization procedure, a lemmatization procedure, a part of speech tagging procedure, a chunking procedure (e.g., to group sets of related words), a vectorization procedure (e.g., to convert natural language text into a set of inputs for machine learning), a corpus collection procedure (e.g., to identify texts or words referred to in vectors generated using the vectorization procedure), and/or the like.

In some implementations, test automation platform 102 may determine a test intent based at least in part on screening the new test case using the natural language processor. For example, test automation platform 102 may predict a type of use case to which the test case is to apply based at least in part on a description of the new test case. In some implementations, test automation platform 102 may determine the test intent using a test intent identification model. For example, test automation platform 102 may generate a machine learning model to correlate test cases (e.g., a data ingestion process test case) to use cases (e.g., a data at rest scenario) to determine an intent of a test case with respect to a type of use for which the test case is to be used.

In some implementations, test automation platform 102 may train the test intent identification model using a data set of test cases. For example, test automation platform 102 may obtain a data set of test cases and associated test scripts that have been executed to test software modules and may divide the data set into a training set (e.g., for training the test intent identification model) and a validation set (e.g., for validating an accuracy of the test intent identification model). In this example, test automation platform 102 may train the test identification model by performing feature identification to identify a set of features (e.g., variables corresponding to data entries in the training data set) that are predictive, and feature reduction to reduce the identified set of features to a subset with a greatest predictive power. Performing feature reduction may reduce a processing utilization associated with training and/or using the test intent identification model. Further, test automation platform 102 may assign weights to the subset of features to enable prediction of a test functionality of a subsequent test case. For example, test automation platform 102 may iteratively apply weights, determine a predictive power of a test intent identification model using the validation set, and selectively adjust the weights based on the predictive power.

In some implementations, test automation platform 102 may determine a test entity subject. For example, test automation platform 102 may predict a type of subject (e.g., software module, such as a type of data ingestion pipeline) to which the test case is to apply. In some implementations, test automation platform 102 may determine the test entity using a test entity identification model. For example, test automation platform 102 may generate a machine learning model to correlate test cases (e.g., a data ingestion process test case) to test entities (e.g., a data ingestion pipeline associated with a particular type of data source with a first type of data format and a particular type of data destination with a second type of data format). In some implementations, test automation platform 102 may train the test entity identification model using a data set of test cases. For example, test automation platform 102 may obtain a data set of test cases and associated test scripts that have been executed to test software modules and may divide the data set into a training set (e.g., for training the test intent identification model) and a validation set (e.g., for validating an accuracy of the test intent identification model). In this example, test automation platform 102 may train the test identification model by performing feature identification to identify a set of features that are predictive, and feature reduction to reduce the identified set of features to a subset with a most predictive power. Further, test automation platform 102 may assign weights to the subset of features to enable prediction of a test entity to which a subsequent test case is to apply. In some implementations, test automation platform 102 may identify a scope of a test case. For example, test automation platform 102 may identify a test pattern for data ingestion, a recommended scenario for a data ingestion procedure, a set of recommended test types, a set of associated test libraries for running a test script on a data ingestion pipeline, and/or the like.

In some implementations, test automation platform 102 may map a test case to a test library. For example, test automation platform 102 may categorize the test case based on the intent, entity subject, scope, and/or the like into a test library including a set of previously received test cases. In some implementations, test automation platform 102 may generate a mapping file for inclusion in a test library. For example, test automation platform 102 may determine a recommendation of a group of test cases to apply to a particular type of data ingestion pipeline testing scenario. In this example, test automation platform 102 may sort the mapping file, using an artificial intelligence processing technique, into a particular test library, such as a file validation library (e.g., for test cases determined to relate to file validation), an error handling library, a data recovery library, and/or the like. In some aspects, test automation platform 102 may generate the mapping file with a particular format. For example, test automation platform 102 may generate the mapping file with a particular scripting format for use in CI/CD pipelines with automated build engineering and test execution and may store the mapping file for use in CI/CD pipeline testing. In this way, the mapping file enables code validation and automated deployment of code.

As shown in FIG. 1B, and by reference number 156, test automation platform 102 may receive information identifying a data ingestion pipeline. For example, test automation platform 102 may receive code associated with obtaining data from a data source and directing the data to a data target (e.g., a data lake, a data structure, or another type of data repository). In some implementations, test automation platform 102 may periodically identify an existing data ingestion pipeline for ongoing testing. For example, when performing CI/CD-based code deployment, test automation platform 102 may periodically determine to test deployed code and/or receive a new build for testing before deployment. In this way, test automation platform 102 enables testing in a CI/CD environment.

As further shown in FIG. 1B, and by reference number 158, test automation platform 102 may validate the data ingestion pipeline. For example, test automation platform 102 may perform a set of processing procedures to test a data ingestion pipeline. In some implementations, test automation platform 102 may perform natural language processing on the data ingestion pipeline. For example, test automation platform 102 may determine characteristics of the data ingestion pipeline by performing natural language processing on a description of the data ingestion pipeline. In this example, test automation platform 102 may determine a data source, a data target, a quantity of hops for data ingestion, an input data format, a target data format, and/or the like. In some implementations, test automation platform 102 may perform pre-processing for natural language processing, as described in more detail above.

In some implementations, test automation platform 102 may select a recommended set of test cases. For example, test automation platform 102 may determine, based on the characteristics of the data ingestion pipeline, a set of test cases for which test scripts are to be executed on the data ingestion pipeline. In some implementations, test automation platform 102 may determine a test pattern based on characteristics of the data ingestion pipeline and using artificial intelligence techniques. For example, test automation platform 102 may train a model of data testing based on a training set of previous testing performed on data ingestion. In this example, test automation platform 102 may perform a machine learning technique and may determine that a particular data source is associated with a threshold likelihood of a particular test case being executed. In this example, test automation platform 102 may determine to execute the test case and/or other test cases determined to have a threshold similarity (e.g., based on natural language processing, processing of code of component test scripts, and/or the like) for the data ingestion pipeline.

In this example, test automation platform 102 may select test cases relating to data quality, data format, data errors, and/or the like. For example, test automation platform 102 may identify a test library and/or a mapping file thereof that includes a set of test cases with test scripts for execution on the data ingestion pipeline. In some implementations, test automation platform 102 may perform a matching procedure to match the data ingestion pipeline to a mapping file. For example, test automation platform 102 may identify a mapping file including a set of test cases that are applicable to the data ingestion pipeline. In some implementations, test automation platform 102 may match a description of the mapping file (e.g., generated based at least in part on descriptions of component test cases of the mapping file) to a description of the data ingestion pipeline. For example, test automation platform 102 may generate matching scores for the description of the data ingestion pipeline relative to descriptions of a set of mapping files (e.g., based on a semantic similarity), and may select a particular mapping file with a highest similarity score.

In some implementations, test automation platform 102 may generate a test case. For example, test automation platform 102 may analyze characteristics of the data ingestion pipeline, characteristics of stored test cases and/or test scripts thereof, and/or the like and may generate a test case including one or more stored test cases and/or test scripts thereof. In this example, test automation platform 102 may generate the test case to maximize a match between the test case and the data ingestion pipeline (e.g., to achieve a higher similarity score relative to similarity scores of existing test cases). In this way, test automation platform 102 may custom generate a test case for a data ingestion pipeline rather than execute a poorly matching test case.

In some implementations, test automation platform 102 may execute a set of tests on the data ingestion pipeline. For example, test automation platform 102 may extract test scripts from test cases of the mapping file and may execute the test scripts to test data integrity, data format, data errors, and/or the like. In this example, test automation platform 102 may execute different test scripts at different hops of the data ingestion pipeline. For example, test automation platform 102 may execute a first set of test scripts at a virtual machine, a second set of test scripts at a relational database, a third set of test scripts at a data warehouse, and/or the like.

In some implementations, test automation platform 102 may determine results of executing the tests. For example, test automation platform 102 may determine that a test script of a test case is passed, failed, partially passed and partially failed, and/or the like. In this example, test automation platform 102 may determine, based on a result of executing each test script, whether the data ingestion pipeline is validated. For example, when each test script is passed, test automation platform 102 may determine that the data ingestion pipeline is validated. Additionally, or alternatively, test automation platform 102 may determine that the data ingestion pipeline is validated when a threshold percentage of test scripts are passed. Additionally, or alternatively, test automation platform 102 may determine that the data ingestion pipeline is validated when one or more test scripts each achieve a threshold partial pass rate.

As further shown in FIG. 1B, and by reference number 160, test automation platform 102 may report and/or store test results. For example, test automation platform 102 may provide information, to client device 104, indicating that a test script is passed, a set of test scripts of a test case are passed, a set of test cases of a mapping file are passed, and/or the like. Additionally, or alternatively, test automation platform 102 may provide information indicating that a test script is failed, partially failed, and/or the like.

As further shown in FIG. 1B, and by reference number 162, test automation platform 102 may deploy the data ingestion pipeline. For example, based on determining that a set of tests (e.g., a set of test scripts of a set of test cases of a mapping file) are passed, test automation platform 102 may automatically deploy the data ingestion pipeline into, for example, a development operations pipeline of big data server 106. In this example, test automation platform 102 may provide code of the data ingestion pipeline, execute code of the data ingestion pipeline, allocate resources to data acquisition and/or data processing associated with the data ingestion pipeline, and/or the like. Additionally, or alternatively, test automation platform 102 and/or a cloud computing environment therewith may provide the data ingestion pipeline by automatically allocating resources for executing code associated with the data ingestion pipeline.

As indicated above, FIGS. 1A and 1B are provided merely as one or more examples. Other examples may differ from what is described with regard to FIGS. 1A and 1B.

Figure 2:
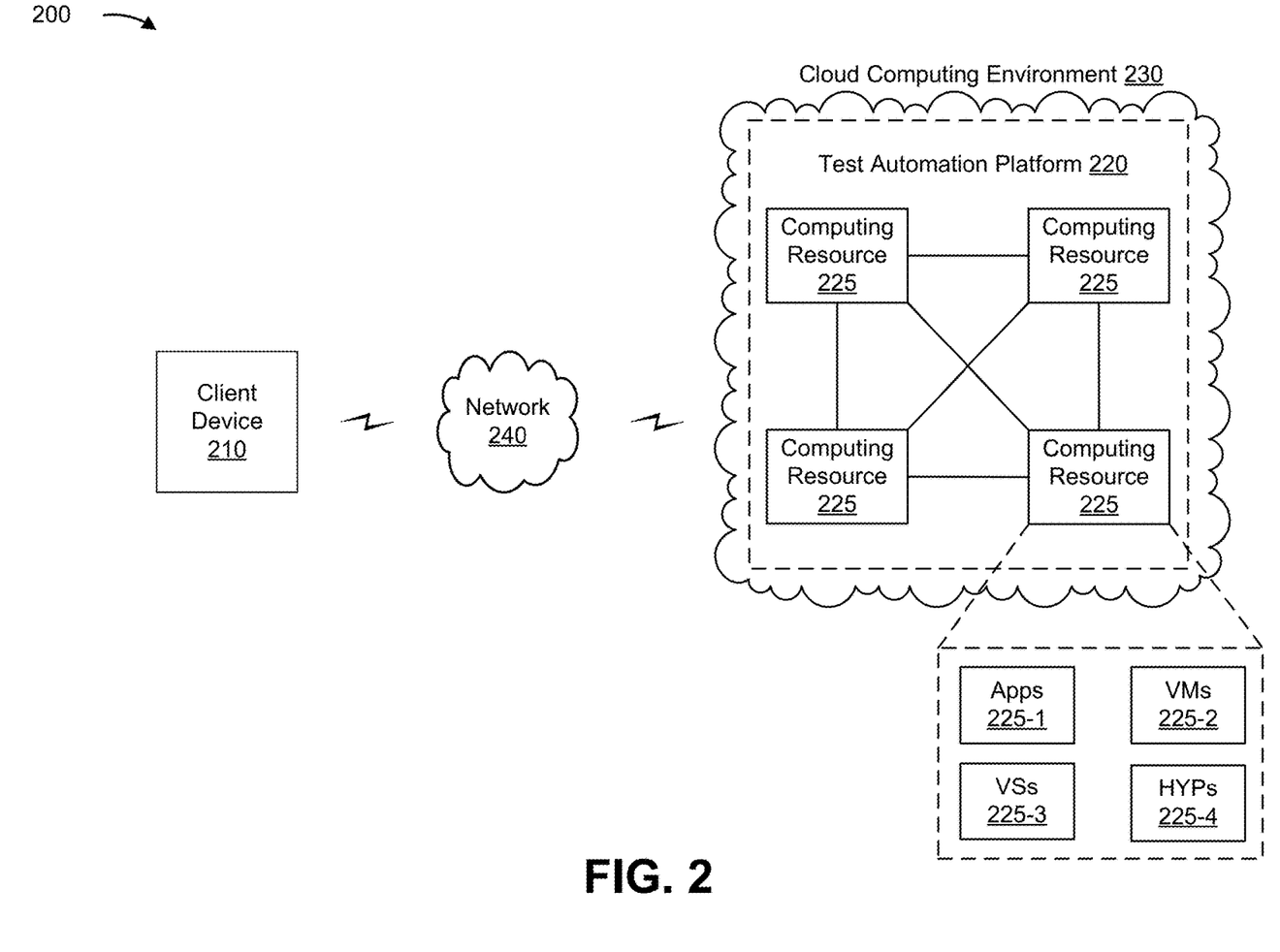
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a test automation platform 220, a computing resource 225, a cloud computing environment 230, and a network 240. Devices of environment 200 may interconnect via wired connections, wireless connections, or a combination of wired and wireless connections.

Client device 210 includes one or more devices capable of receiving, generating, storing, processing, and/or providing information associated with analyzing a test case. For example, client device 210 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

Test automation platform 220 includes one or more computing resources assigned to analyze a test case. For example, test automation platform 220 may be a platform implemented by cloud computing environment 230 that may analyze a test case. In some implementations, test automation platform 220 is implemented by computing resources 225 of cloud computing environment 230.

Test automation platform 220 may include a server device or a group of server devices. In some implementations, test automation platform 220 may be hosted in cloud computing environment 230. Notably, while implementations described herein may describe test automation platform 220 as being hosted in cloud computing environment 230, in some implementations, test automation platform 220 may be non-cloud-based or may be partially cloud-based.

Cloud computing environment 230 includes an environment that delivers computing as a service, whereby shared resources, services, and/or the like may be provided to analyze a test case. Cloud computing environment 230 may provide computation, software, data access, storage, and/or other services that do not require end-user knowledge of a physical location and configuration of a system and/or a device that delivers the services. As shown, cloud computing environment 230 may include a test automation platform 220 and a computing resource 225.

Computing resource 225 includes one or more personal computers, workstation computers, server devices, or another type of computation and/or communication device. In some implementations, computing resource 225 may host test automation platform 220. The cloud resources may include compute instances executing in computing resource 225, storage devices provided in computing resource 225, data transfer devices provided by computing resource 225, and/or the like. In some implementations, computing resource 225 may communicate with other computing resources 225 via wired connections, wireless connections, or a combination of wired and wireless connections.

As further shown in FIG. 2, computing resource 225 may include a group of cloud resources, such as one or more applications ("APPs") 225-1, one or more virtual machines ("VMs") 225-2, virtualized storage ("VSs") 225-3, one or more hypervisors ("HYPs") 225-4, or the like.

Application 225-1 includes one or more software applications that may be provided to or accessed by client device 210. Application 225-1 may eliminate a need to install and execute the software applications on client device 210. For example, application 225-1 may include software associated with test automation platform 220 and/or any other software capable of being provided via cloud computing environment 230. In some implementations, one application 225-1 may send/receive information to/from one or more other applications 225-1, via virtual machine 225-2.

Virtual machine 225-2 includes a software implementation of a machine (e.g., a computer) that executes programs like a physical machine. Virtual machine 225-2 may be either a system virtual machine or a process virtual machine, depending upon use and degree of correspondence to any real machine by virtual machine 225-2. A system virtual machine may provide a complete system platform that supports execution of a complete operating system ("OS"). A process virtual machine may execute a single program and may support a single process. In some implementations, virtual machine 225-2 may execute on behalf of a user (e.g., client device 210), and may manage infrastructure of cloud computing environment 230, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 may present a virtual operating platform to the guest operating systems and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
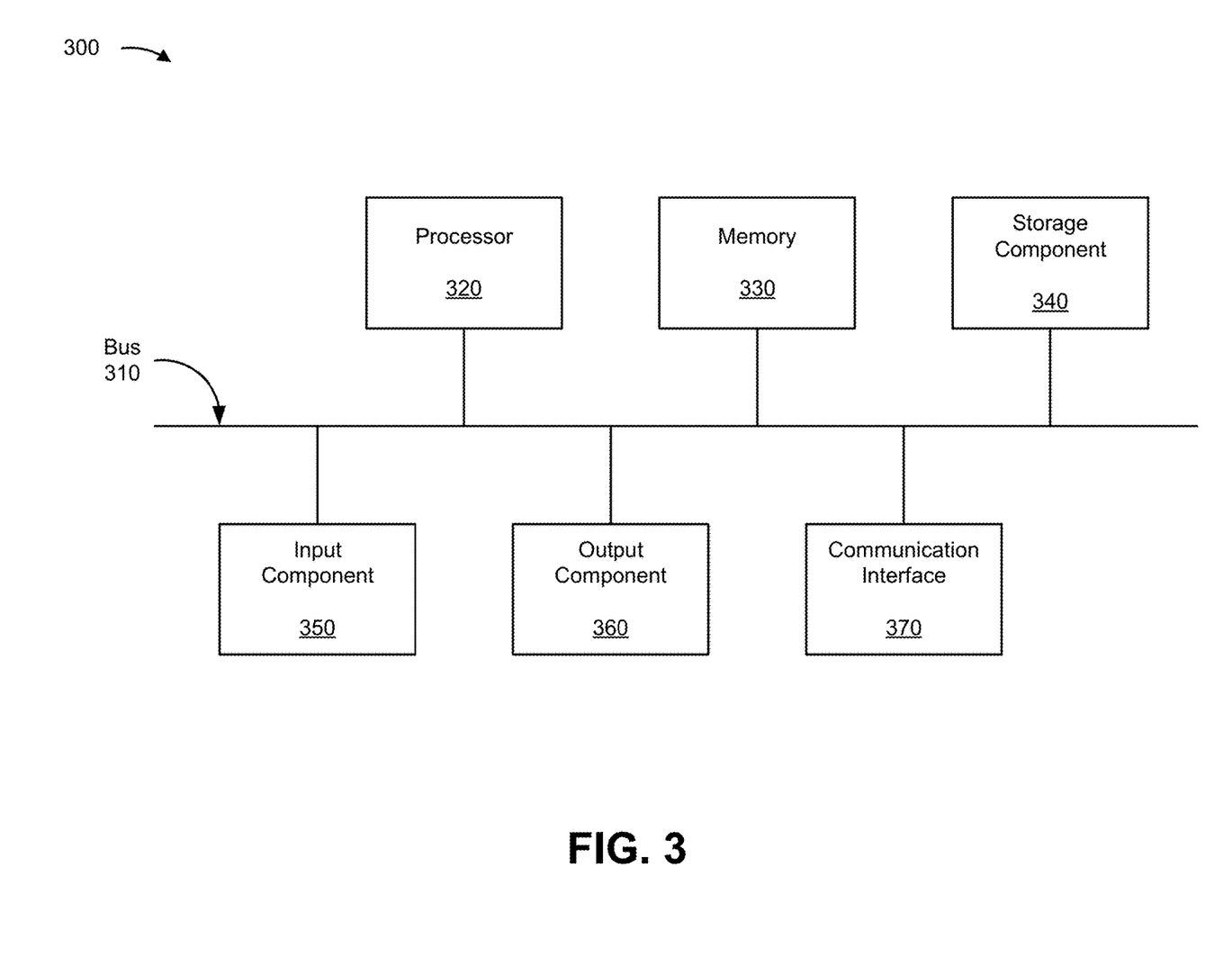
FIG. 3 is a diagram of example components of one or more devices of FIG. 2.

FIG. 3 is a diagram of example components of a device 300. Device 300 may correspond to client device 210, test automation platform 220, and/or computing resource 225. In some implementations, client device 210, test automation platform 220, and/or computing resource 225 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among multiple components of device 300. Processor 320 is implemented in hardware, firmware, and/or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
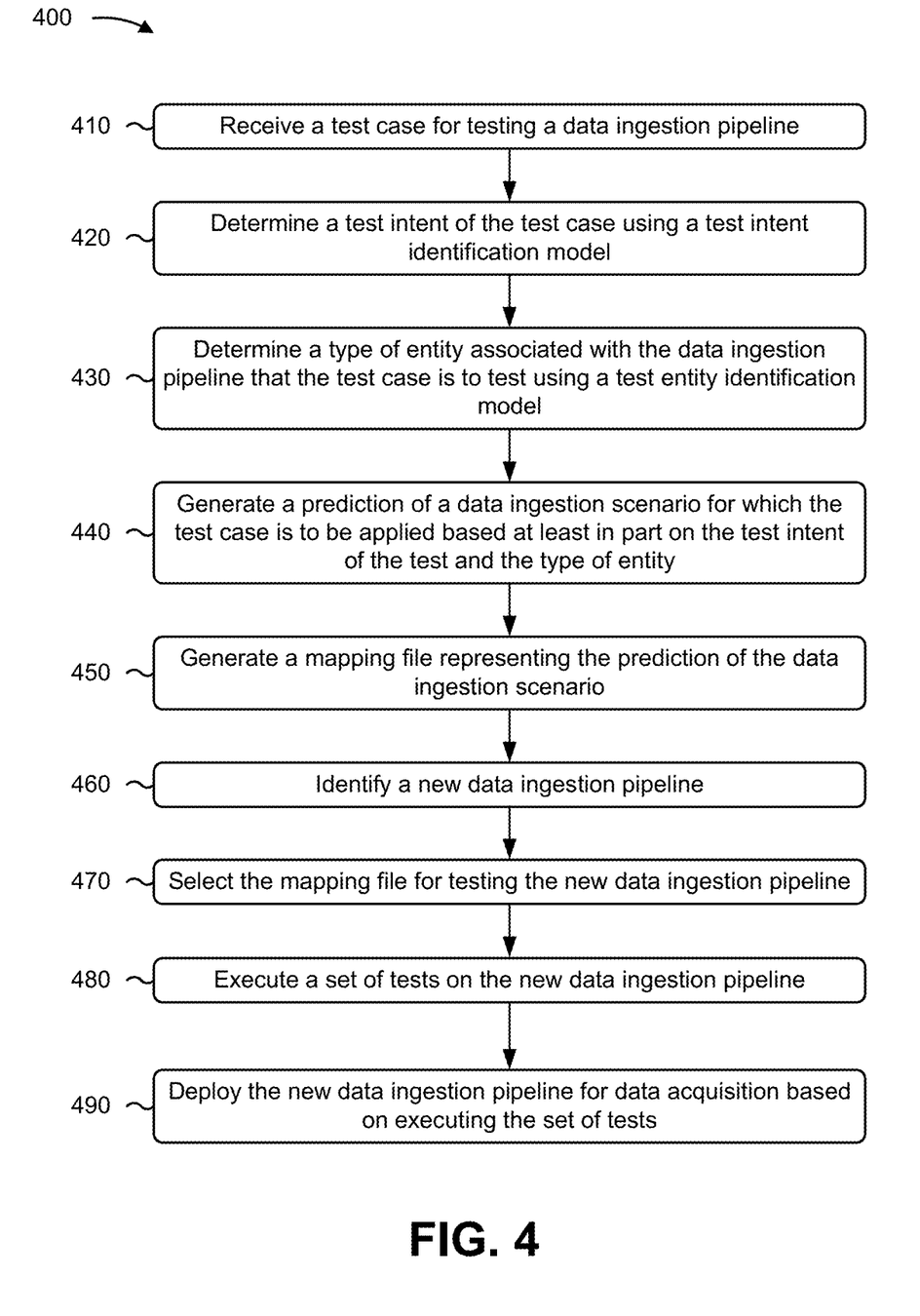
FIGS. 4-6 are flow charts of example processes for test automation for data processing systems.

FIG. 4 is a flow chart of an example process 400 for test automation for data processing systems. In some implementations, one or more process blocks of FIG. 4 may be performed by a test automation platform (e.g., test automation platform 220). In some implementations, one or more process blocks of FIG. 4 may be performed by another device or a group of devices separate from or including the test automation platform, such as a client device (e.g., client device 210) and a computing resource (e.g., computing resource 225), and/or the like.

As shown in FIG. 4, process 400 may include receiving a test case for testing a data ingestion pipeline (block 410). For example, the test automation platform (e.g., using processor 320, memory 330, storage component 340, input component 350, output component 360, communication interface 370 and/or the like) may receive a test case for testing a data ingestion pipeline, as described above.

As further shown in FIG. 4, process 400 may include determining a test intent of the test case using a test intent identification model (block 420). For example, the test automation platform (e.g., using processor 320, memory 330, storage component 340, input component 350, output component 360, communication interface 370 and/or the like) may determine a test intent of the test case using a test intent identification model, as described above.

As further shown in FIG. 4, process 400 may include determining a type of entity associated with the data ingestion pipeline that the test case is to test using a test entity identification model (block 430). For example, the test automation platform (e.g., using processor 320, memory 330, storage component 340, input component 350, output component 360, communication interface 370 and/or the like) may determine a type of entity associated with the data ingestion pipeline that the test case is to test using a test entity identification model, as described above.

As further shown in FIG. 4, process 400 may include generating a prediction of a data ingestion scenario for which the test case is to be applied based at least in part on the test intent of the test and the type of entity (block 440). For example, the test automation platform (e.g., using processor 320, memory 330, storage component 340, input component 350, output component 360, communication interface 370 and/or the like) may generate a prediction of a data ingestion scenario for which the test case is to be applied based at least in part on the test intent of the test and the type of entity, as described above.

As further shown in FIG. 4, process 400 may include generating a mapping file representing the prediction of the data ingestion scenario (block 450). For example, the test automation platform (e.g., using processor 320, memory 330, storage component 340, input component 350, output component 360, communication interface 370 and/or the like) may generate a mapping file representing the prediction of the data ingestion scenario, as described above.

As further shown in FIG. 4, process 400 may include identifying a new data ingestion pipeline (block 460). For example, the test automation platform (e.g., using processor 320, memory 330, storage component 340, input component 350, output component 360, communication interface 370 and/or the like) may identify a new data ingestion pipeline, as described above.

As further shown in FIG. 4, process 400 may include selecting, using a testing model, the mapping file for testing the new data ingestion pipeline (block 470). For example, the test automation platform (e.g., using processor 320, memory 330, storage component 340, input component 350, output component 360, communication interface 370 and/or the like) may select, using a testing model, the mapping file for testing the new data ingestion pipeline, as described above.

As further shown in FIG. 4, process 400 may include executing, using test cases of the mapping file, a set of tests on the new data ingestion pipeline (block 480). For example, the test automation platform (e.g., using processor 320, memory 330, storage component 340, input component 350, output component 360, communication interface 370 and/or the like) may execute, using test cases of the mapping file, a set of tests on the new data ingestion pipeline, as described above.

As further shown in FIG. 4, process 400 may include deploying, test automation platform, the new data ingestion pipeline for data acquisition based on executing the set of tests (block 490). For example, the test automation platform (e.g., using processor 320, memory 330, storage component 340, input component 350, output component 360, communication interface 370 and/or the like) may deploy, test automation platform, the new data ingestion pipeline for data acquisition based on executing the set of tests, as described above.

Process 400 may include additional implementations, such as any single implementation or any combination of implementations described below and/or in connection with one or more other processes described elsewhere herein.

In a first implementation, analyzing the test case includes performing data pre-processing on the test case to determine a semantic meaning of natural language text of the test case.

In a second implementation, alone or in combination with the first implementation, performing data pre-processing includes at least one of: a tokenization procedure, a lemmatization procedure, a part of speech tagging procedure, a chunking procedure, or a vectorization procedure.

In a third implementation, alone or in combination with one or more of the first and second implementations, selecting the mapping file includes mapping the new data ingestion pipeline to a test library.

In a fourth implementation, alone or in combination with one or more of the first through third implementations, executing the set of tests includes ingesting data using the new data ingestion pipeline; validating the ingested data using the test case, and providing test results indicating that the ingested data is validated.

In a fifth implementation, alone or in combination with one or more of the first through fourth implementations, process 400 includes detecting a change to a data ingestion parameter, and modifying the mapping file based on the change to the data ingestion parameter.

In a sixth implementation, alone or in combination with one or more of the first through fifth implementations, the change is at least one of a change to a data source, a change to a data format, or a change to a load frequency.

In a seventh implementation, alone or in combination with one or more of the first through sixth implementations, executing the set of tests includes generating a test script, that includes the test case, based on the mapping file, and executing the test script.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
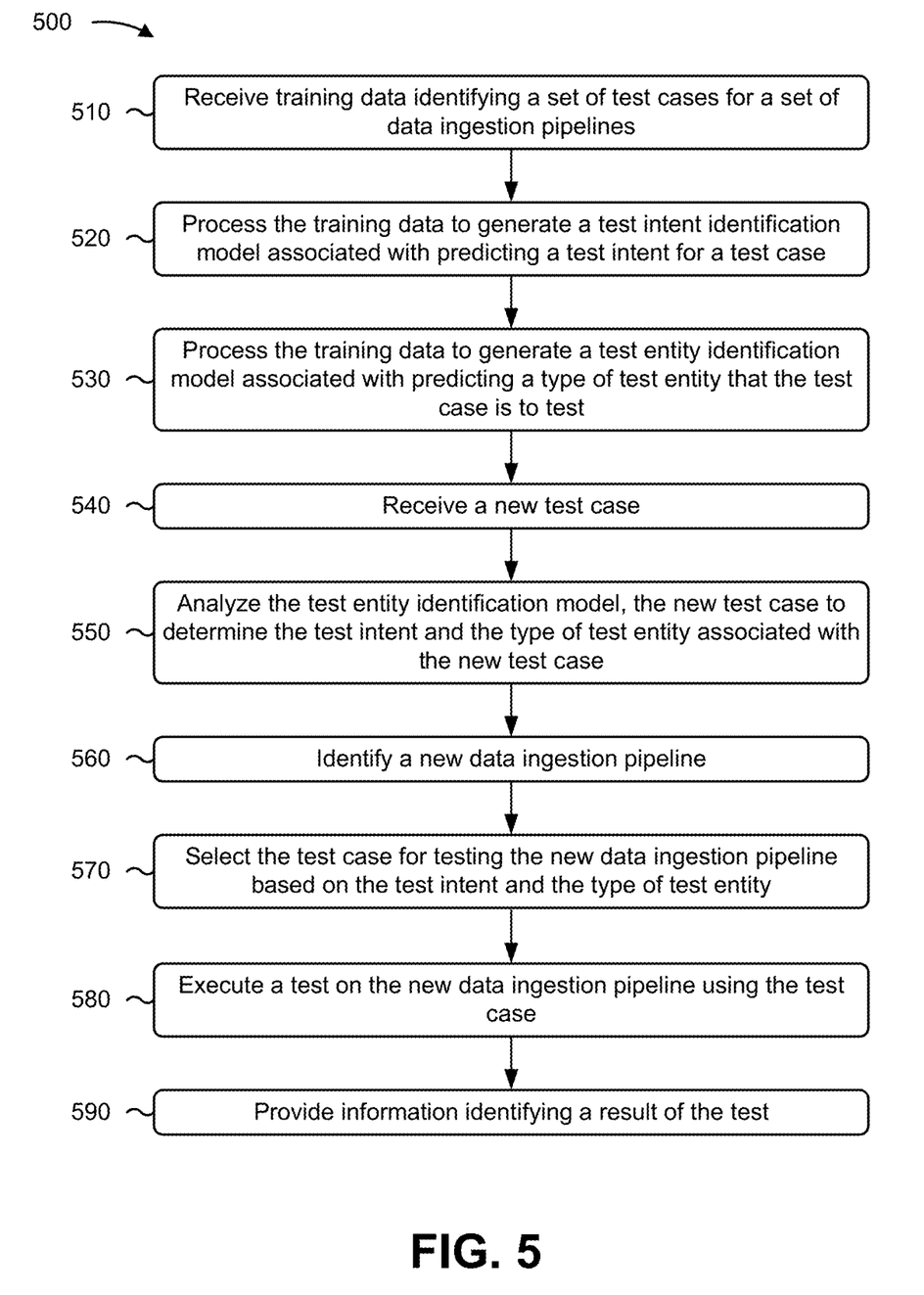

FIG. 5 is a flow chart of an example process 500 for test automation for data processing systems. In some implementations, one or more process blocks of FIG. 5 may be performed by a test automation platform (e.g., test automation platform 220). In some implementations, one or more process blocks of FIG. 5 may be performed by another device or a group of devices separate from or including the test automation platform, such as a client device (e.g., client device 210) and a computing resource (e.g., computing resource 225), and/or the like.

As shown in FIG. 5, process 500 may include receiving training data identifying a set of test cases for a set of data ingestion pipelines (block 510). For example, the test automation platform (e.g., using processor 320, memory 330, storage component 340, input component 350, output component 360, communication interface 370 and/or the like) may receive training data identifying a set of test cases for a set of data ingestion pipelines, as described above.

As further shown in FIG. 5, process 500 may include processing the training data to generate a test intent identification model associated with predicting a test intent for a test case (block 520). For example, the test automation platform (e.g., using processor 320, memory 330, storage component 340, input component 350, output component 360, communication interface 370 and/or the like) may process the training data to generate a test intent identification model associated with predicting a test intent for a test case, as described above.

As further shown in FIG. 5, process 500 may include processing the training data to generate a test entity identification model associated with predicting a type of test entity that the test case is to test (block 530). For example, the test automation platform (e.g., using processor 320, memory 330, storage component 340, input component 350, output component 360, communication interface 370 and/or the like) may process the training data to generate a test entity identification model associated with predicting a type of test entity that the test case is to test, as described above.

As further shown in FIG. 5, process 500 may include receiving a new test case (block 540). For example, the test automation platform (e.g., using processor 320, memory 330, storage component 340, input component 350, output component 360, communication interface 370 and/or the like) may receive a new test case, as described above.

As further shown in FIG. 5, process 500 may include analyzing, using the test intent identification model and the test entity identification model, the new test case to determine the test intent and the type of test entity associated with the new test case (block 550). For example, the test automation platform (e.g., using processor 320, memory 330, storage component 340, input component 350, output component 360, communication interface 370 and/or the like) may analyze, using the test intent identification model and the test entity identification model, the new test case to determine the test intent and the type of test entity associated with the new test case, as described above.

As further shown in FIG. 5, process 500 may include identifying a new data ingestion pipeline (block 560). For example, the test automation platform (e.g., using processor 320, memory 330, storage component 340, input component 350, output component 360, communication interface 370 and/or the like) may identify a new data ingestion pipeline, as described above.

As further shown in FIG. 5, process 500 may include selecting the test case for testing the new data ingestion pipeline based on the test intent and the type of test entity (block 570). For example, the test automation platform (e.g., using processor 320, memory 330, storage component 340, input component 350, output component 360, communication interface 370 and/or the like) may select the test case for testing the new data ingestion pipeline based on the test intent and the type of test entity, as described above.

As further shown in FIG. 5, process 500 may include executing a test on the new data ingestion pipeline using the test case (block 580). For example, the test automation platform (e.g., using processor 320, memory 330, storage component 340, input component 350, output component 360, communication interface 370 and/or the like) may execute a test on the new data ingestion pipeline using the test case, as described above.

As further shown in FIG. 5, process 500 may include providing information identifying a result of the test (block 590). For example, the test automation platform (e.g., using processor 320, memory 330, storage component 340, input component 350, output component 360, communication interface 370 and/or the like) may provide information identifying a result of the test, as described above.

Process 500 may include additional implementations, such as any single implementation or any combination of implementations described below and/or in connection with one or more other processes described elsewhere herein.

In a first implementation, process 500 includes automatically deploying the new data ingestion pipeline based on the result of the test.

In a second implementation, alone or in combination with the first implementation, process 500 includes automatically rejecting the new data ingestion pipeline based on the result of the test.

In a third implementation, alone or in combination with one or more of the first and second implementations, process 500 includes automatically scheduling the new data ingestion pipeline for debugging based on the result of the test.

In a fourth implementation, alone or in combination with one or more of the first through third implementations, process 500 includes automatically altering the new data ingestion pipeline to correct an error identified based on the result of the test.

In a fifth implementation, alone or in combination with one or more of the first through fourth implementations, process 500 includes automatically incorporating new data obtained using the new data ingestion pipeline into a stored data set based on the result of the test.

In a sixth implementation, alone or in combination with one or more of the first through fifth implementations, processing the training data includes at least one of a corpus identification procedure, a tokenization procedure, a lemmatization procedure, a part of speech tagging procedure, a chunking procedure, or a vectorization procedure.

In a seventh implementation, alone or in combination with one or more of the first through sixth implementations, process 500 includes ingesting data using the new data ingestion pipeline, and validating the ingested data using the test case.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
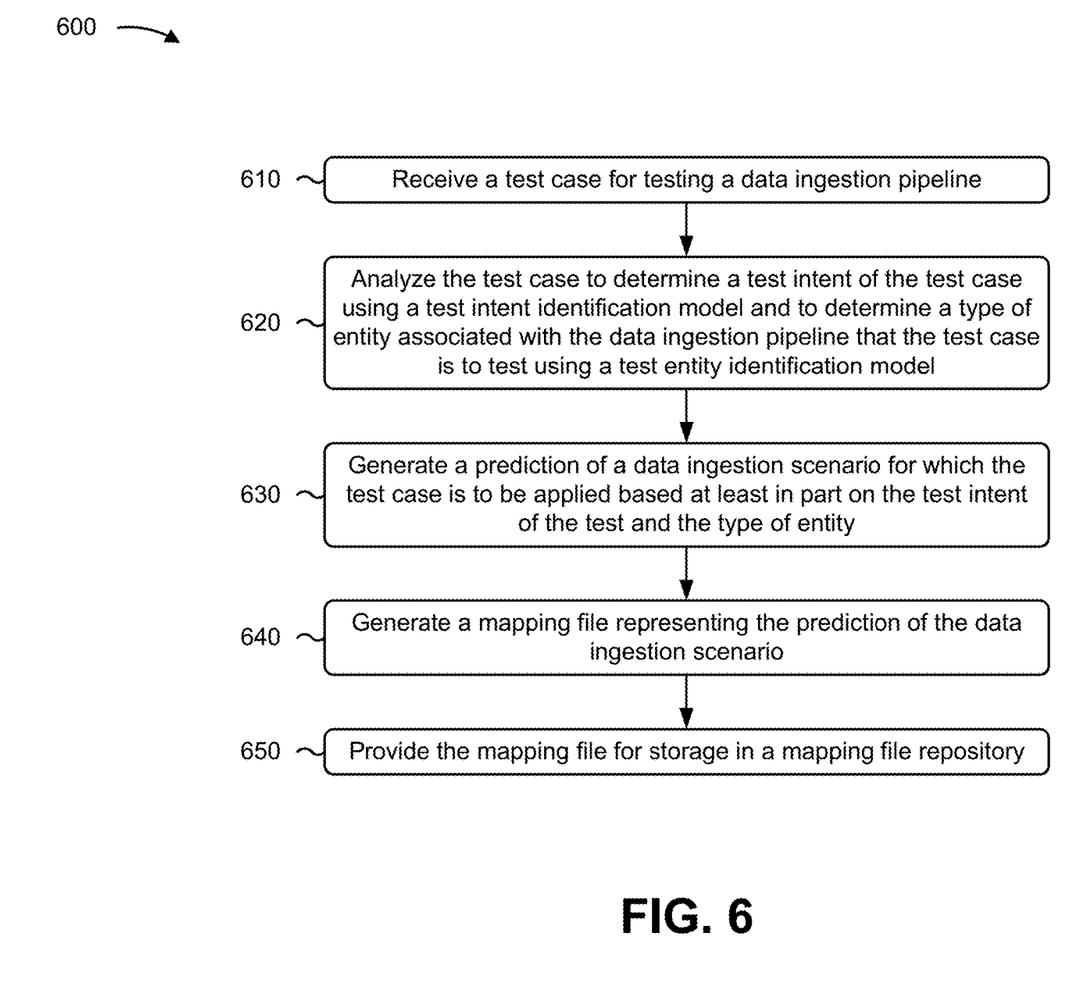

FIG. 6 is a flow chart of an example process 600 for test automation for data processing systems. In some implementations, one or more process blocks of FIG. 6 may be performed by a test automation platform (e.g., test automation platform 220). In some implementations, one or more process blocks of FIG. 6 may be performed by another device or a group of devices separate from or including the test automation platform, such as a client device (e.g., client device 210) and a computing resource (e.g., computing resource 225), and/or the like.

As shown in FIG. 6, process 600 may include receiving a test case for testing a data ingestion pipeline (block 610). For example, the test automation platform (e.g., using processor 320, memory 330, storage component 340, input component 350, output component 360, communication interface 370 and/or the like) may receive a test case for testing a data ingestion pipeline, as described above.

As further shown in FIG. 6, process 600 may include analyzing the test case to determine a test intent of the test case using a test intent identification model and to determine a type of entity associated with the data ingestion pipeline that the test case is to test using a test entity identification model (block 620). For example, the test automation platform (e.g., using processor 320, memory 330, storage component 340, input component 350, output component 360, communication interface 370 and/or the like) may analyze the test case to determine a test intent of the test case using a test intent identification model and to determine a type of entity associated with the data ingestion pipeline that the test case is to test using a test entity identification model, as described above.

As further shown in FIG. 6, process 600 may include generating a prediction of a data ingestion scenario for which the test case is to be applied based at least in part on the test intent of the test and the type of entity (block 630). For example, the test automation platform (e.g., using processor 320, memory 330, storage component 340, input component 350, output component 360, communication interface 370 and/or the like) may generate a prediction of a data ingestion scenario for which the test case is to be applied based at least in part on the test intent of the test and the type of entity, as described above.

As further shown in FIG. 6, process 600 may include generating a mapping file representing the prediction of the data ingestion scenario (block 640). For example, the test automation platform (e.g., using processor 320, memory 330, storage component 340, input component 350, output component 360, communication interface 370 and/or the like) may generate a mapping file representing the prediction of the data ingestion scenario, as described above.

As further shown in FIG. 6, process 600 may include providing the mapping file for storage in a mapping file repository (block 650). For example, the test automation platform (e.g., using processor 320, memory 330, storage component 340, input component 350, output component 360, communication interface 370 and/or the like) may provide the mapping file for storage in a mapping file repository, as described above.

Process 600 may include additional implementations, such as any single implementation or any combination of implementations described below and/or in connection with one or more other processes described elsewhere herein.

In a first implementation, process 600 includes receiving a new data ingestion pipeline for testing; retrieving the mapping file from the mapping file repository; and automatically executing a set of tests on the new data ingestion pipeline based on the mapping file.

In a second implementation, alone or in combination with the first implementation, process 600 includes detecting a change to a data ingestion parameter; modifying the mapping file based on the change to the data ingestion parameter; and storing the modified mapping file.

In a third implementation, alone or in combination with one or more of the first and second implementations, the change is at least one of a change to a data source, a change to a data format, or a change to a load frequency.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a test automation platform, a test case for testing a data ingestion pipeline;
determining, by the test automation platform, a test intent of the test case using a test intent identification model;
determining a type of entity associated with the data ingestion pipeline that the test case is to test using a test entity identification model;
generating, by the test automation platform, a prediction of a data ingestion scenario for which the test case is to be applied based at least in part on the test intent of the test and the type of entity;
generating, by the test automation platform, a mapping file representing the prediction of the data ingestion scenario;
identifying, by the test automation platform, a new data ingestion pipeline;
selecting, by the test automation platform and using a testing model, the mapping file for testing the new data ingestion pipeline;
executing, by the test automation platform and using test cases of the mapping file, a set of tests on the new data ingestion pipeline; and deploying, by the test automation platform, the new data ingestion pipeline for data acquisition based on executing the set of tests.

2. The method of claim 1, wherein analyzing the test case comprises:
performing data pre-processing on the test case to determine a semantic meaning of natural language text of the test case.

3. The method of claim 2, wherein performing data pre-processing includes at least one of:
a tokenization procedure,
a lemmatization procedure,
a part of speech tagging procedure,
a chunking procedure, or
a vectorization procedure.

4. The method of claim 1, wherein selecting the mapping file comprises:
mapping the new data ingestion pipeline to a test library.

5. The method of claim 1, wherein executing the set of tests comprises:
ingesting data using the new data ingestion pipeline;
validating the ingested data using the test case; and
providing test results indicating that the ingested data is validated.

6. The method of claim 1, further comprising:
detecting a change to a data ingestion parameter; and
modifying the mapping file based on the change to the data ingestion parameter.

7. The method of claim 6, wherein the change is at least one of:
a change to a data source,
a change to a data format, or
a change to a load frequency.

8. The method of claim 1, wherein executing the set of tests comprises:
generating a test script, that includes the test case, based on the mapping file; and
executing the test script.

9. A test automation platform, comprising:
one or more memories; and
one or more processors communicatively coupled to the one or more memories, configured to:
receive training data identifying a set of test cases for a set of data ingestion pipelines;
process the training data to generate a test intent identification model associated with predicting a test intent for a test case;
process the training data to generate a test entity identification model associated with predicting a type of test entity that the test case is to test;
receive a new test case;
analyze, using the test intent identification model and the test entity identification model, the new test case to determine the test intent and the type of test entity associated with the new test case;
identify a new data ingestion pipeline;
select the test case for testing the new data ingestion pipeline based on the test intent and the type of test entity;
execute a test on the new data ingestion pipeline using the test case; and
provide information identifying a result of the test.

10. The test automation platform of claim 9, wherein the one or more processors are further configured to:
automatically deploy the new data ingestion pipeline based on the result of the test.

11. The test automation platform of claim 10, wherein processing the training data includes at least one of:
a corpus identification procedure,
a tokenization procedure,
a lemmatization procedure,
a part of speech tagging procedure,
a chunking procedure, or
a vectorization procedure.

12. The test automation platform of claim 9, wherein the one or more processors are further configured to:
automatically reject the new data ingestion pipeline based on the result of the test.

13. The test automation platform of claim 9, wherein the one or more processors are further configured to:
automatically schedule the new data ingestion pipeline for debugging based on the result of the test.

14. The test automation platform of claim 9, wherein the one or more processors are further configured to:
automatically alter the new data ingestion pipeline to correct an error identified based on the result of the test.

15. The test automation platform of claim 9, wherein the one or more processors are further configured to:
automatically incorporate new data obtained using the new data ingestion pipeline into a stored data set based on the result of the test.

16. The test automation platform of claim 9, wherein the one or more processors, when executing the test, are configured to:
ingest data using the new data ingestion pipeline; and
validate the ingested data using the test case.

17. A non-transitory computer-readable medium storing instructions, the instructions comprising:
one or more instructions that, when executed by one or more processors, cause the one or more processors to:
receive a test case for testing a data ingestion pipeline;
analyze the test case to determine a test intent of the test case using a test intent identification model and to determine a type of entity associated with the data ingestion pipeline that the test case is to test using a test entity identification model;
generate a prediction of a data ingestion scenario for which the test case is to be applied based at least in part on the test intent of the test and the type of entity;
generate a mapping file representing the prediction of the data ingestion scenario; and
provide the mapping file for storage in a mapping file repository.

18. The non-transitory computer-readable medium of claim 17, wherein the one or more instructions, when executed by the one or more processors, further cause the one or more processors to:
receive a new data ingestion pipeline for testing;
retrieve the mapping file from the mapping file repository; and
automatically execute a set of tests on the new data ingestion pipeline based on the mapping file.

19. The non-transitory computer-readable medium of claim 17, wherein the one or more instructions, when executed by the one or more processors, further cause the one or more processors to:
detect a change to a data ingestion parameter;
modify the mapping file based on the change to the data ingestion parameter; and
store the modified mapping file.

20. The non-transitory computer-readable medium of claim 19, wherein the change is at least one of:

a change to a data source,
a change to a data format, or
a change to a load frequency.

\* \* \* \* \*